(12) United States Patent
Colombo

(10) Patent No.: US 6,221,288 B1
(45) Date of Patent: Apr. 24, 2001

(54) METHOD OF PRODUCING COMPOSITE MATERIALS AND STRATIFORM COMPOSITES

(75) Inventor: Gian Carlo Colombo, San Giorgio Su Legnano (IT)

(73) Assignee: ICMA San Giorgio S.p.A., San Giorgio Su Legnano (IT)

(*) Notice: Subject to any disclaimer, the term of this patent is extended or adjusted under 35 U.S.C. 154(b) by 0 days.

(21) Appl. No.: 08/970,211

(22) Filed: Nov. 14, 1997

Related U.S. Application Data

(62) Division of application No. 08/576,693, filed on Dec. 21, 1995, now Pat. No. 5,743,986.

(30) Foreign Application Priority Data

Feb. 14, 1995 (IT) .............................................. MI95A0262

(51) Int. Cl.[7] .................................................. B29C 47/06
(52) U.S. Cl. ................................ 264/37.32; 264/173.14; 264/177.2; 264/920
(58) Field of Search ............................ 264/173.14, 177.2, 264/920, DIG. 57; 428/515, 519; 156/244.11

(56) References Cited

U.S. PATENT DOCUMENTS

| | | |
|---|---|---|
| 4,203,876 | 5/1980 | Dereppe et al. . |
| 4,619,849 * | 10/1986 | Anzawa et al. .................... 428/35 |
| 4,746,688 | 5/1988 | Bistak et al. . |
| 4,889,669 * | 12/1989 | Suzuki ............................. 264/45.9 |
| 4,931,327 * | 6/1990 | Liu et al. ......................... 428/36.5 |
| 5,106,696 | 4/1992 | Chundury et al. . |
| 5,106,790 * | 4/1992 | Hashimoto et al. ................ 501/95 |
| 5,310,584 * | 5/1994 | Jacoby et al. ..................... 428/2 |
| 5,743,986 * | 4/1998 | Colombo ....................... 156/244.11 |

FOREIGN PATENT DOCUMENTS

| | | |
|---|---|---|
| 40 09 638 | 10/1991 | (DE) . |
| 0 165 093 | 12/1985 | (EP) . |
| 0 172 436 | 2/1986 | (EP) . |
| 0 292 584 | 11/1988 | (EP) . |
| 0 319 589 | 6/1989 | (EP) . |
| 0 540 026 | 5/1993 | (EP) . |
| 2 222 208 | 10/1974 | (FR) . |
| 1 507 966 | 4/1978 | (GB) . |

OTHER PUBLICATIONS

Database WPI Week 8950 Derwent Publications Ltd., London, GB; AN 89–367469 & JP–A–01 275 136 (MITSUI PETROCHEM IND KK), Nov. 2, 1989.

Database WPI Week 8446 Derwent Publications Ltd., London, GB; AN 84–285330 & JP–A–59 176 045 (KASAI KOGYO KK), Oct. 5, 1984.

Pe Plast Europe, No. 1, Apr. 1993, Munchen De, pp. 48–52, H. Kurrer 'Direct Extrusion of Filled Polyolefins'.

* cited by examiner

Primary Examiner—Jan H. Silbaugh
Assistant Examiner—Mark Eashoo
(74) Attorney, Agent, or Firm—Blank Rome Comisky & McCauley LLP

(57) ABSTRACT

A method of producing a composite stratiform material uses at least one extruder having a pair of co-rotating screws to co-extrude at least three layers, each layer having polypropylene and at least one filler. In a carrier layer the filler is particulate organic filler, and in first and second outer layers the filler is an inorganic filler. The co-extrusion provides for interfusion of the carrier layer with the outer layers at mutually opposite layer interfaces. The particulate organic filler of the carrier layer is either vegetabilic or wood which is extruded by a co-rotational extruder. The inorganic filler is introduced into at least one second extruder for extruding at least one of the outer layers.

11 Claims, 1 Drawing Sheet

METHOD OF PRODUCING COMPOSITE MATERIALS AND STRATIFORM COMPOSITES

This application is a division of U.S. patent application Ser. No. 08/576,693 filed Dec. 21, 1995 now U.S. Pat. No. 5,743,986.

European patent application No. 94500081.8 (published after the priority data of the present application) concerns a procedure for manufacturing laminated thermoformable panels for use as vehicle doors, trays or packaging containers by simultaneous extrusion of (I) a matrix (also termed central layer) made of what is termed a homogenized and gelled pre-mix of organic fibers plus a polyolefin formed in a counter-rotating double-screw extrusion press, and (II) two external layers made of polyolefin and a mineral filler formed by means of a co-rotating double-screw extrusion press.

Such double-screw or "twin screw" extruders of both the counter-rotating as well as the co-rotating type are known in the art and European patent 0 426 619 illustrates a particular preferred extruder of the latter type.

According to the European application EP94500081.8 mentioned above, organic fibers are used as filler for the central layer, apparently intended to serve as a carrier or bulk layer for the laminate; a 50/50 mixture of an olefin with organic fibers is mentioned in the example of EP94500081.8 for the central matrix layer while a 60/40 mixture of an olefine and a mineral filler is used to extrude the external layers which are said to provide a better finish of panels made of these materials if compared with prior art panel materials. Further, it is alleged in EP94500081.8 that the panel structures described therein have a different structure and are made of components that provide for better quality and characteristics than prior art panels.

The present invention, according to a first aspect thereof, aims at a method of producing a composite stratiform material by co-extrusion of at least three layers, each comprising polypropylene and at least one filler, said co-extrusion being effected by means of at least two, and preferably three, extruders each having a pair of co-rotating screws, characterized by co-extrusion of: (I) a carrier layer formed of a mixture containing polypropylene and a particulate organic filler; (II) a first outer layer consisting essentially of a mixture containing polypropylene and an inorganic filler; and (III) a second outer layer consisting essentially of a mixture containing polypropylene and an inorganic filler; said co-extrusion being carried out in a manner to ensure an integral structure, i.e. provides for interfusion of the carrier layer with each of the first and second outer layers at mutually opposite interfaces between the carrier layer and the outer layers.

It is believed to be essential for a preferred embodiment of the present invention in view of abrasion resistance that at least one and preferably both outer layers essentially consist of, rather than contain, polypropylene and in inorganic filler which, in turn, is particulate and generally not fibrous. Preferably, average particle sizes of the inorganic filler are in the range of from about 1 to about 500 $\mu$m, preferably in the range of from about 5 to about 100 $\mu$m, and specific examples will be given below.

If the outer layers contain other components, e.g. stabilizers, dyes or pigment, such other components should, in general, not exceed an amount of 10%, by weight, based upon the weight of the composition forming the outer layers. Inorganic pigment is, of course, regarded as "mineral filler". It is to be noted that maximum abrasion resistance is of essence for that outer layer which will be exposed to maximum abrasion. Now, in the preferred use of the stratiform material according to the invention, i.e. for manufacture of fruit or vegetable containers in the form of crates or boxes, such containers generally will have an "outer" and an "inner" surface, each of which is exposed to different types of wear. Typically, in the case of fruit or vegetable boxes, the abrasion wear of the "outer" surface (i.e. the one frequently exposed to contact with the ground or other external bodies) will be substantially greater than that of the "inner" surface, i.e. the one in contact with the content of the containers, viz. vegetables or fruits.

When considering the general performance and use-properties of crates or boxes for packaging of fruits or vegetables and similar goods, two criteria—in addition to the costs of materials and manufacturing methods—are of primary importance, namely minimum weight and maximum stability, the latter notably including abrasion wear resistance.

Now, while mineral fillers increase abrasion wear resistance of a polypropylene composition containing them, such fillers will also tend to increase the specific weight of the composition containing them. Contrariwise, organic fillers will decrease the specific weight of a polypropylene composition containing them but impart less abrasion resistance, if any, to such a composition.

Hence, another preferred composite material according to the invention, as well as a container made of such material, will have a first outer layer consisting essentially of polypropylene and particulate mineral filler finely dispersed therein for maximum abrasion wear resistance, a central layer containing polypropylene and a major amount, at least, of an organic particulate filler for minimum specific weight, and a second outer layer with a balance of sufficient high wear resistance and sufficiently low specific weight. Such second outer layer will be used at the inner surface of the container made of such an "asymmetric" composite material. "Asymmetric" structure in this context is intended to refer to a composite material according to the invention where one of the outer layers contains a higher proportion of mineral filler than the other.

Generally, the term "particulate" is used herein in the sense of a material consisting of essentially compact particle shapes that show no clear preference for a specific, i.e. longitudinal, dimension. With reference to the organic filler used for the central layer to minimize the specific weight thereof, particulate wood in the form of wood flour, saw-dust and the like conventional forms of particulate wood with a typical average particle size in the range of from about 0.01–5 mm is preferred but other forms of particulate organic and preferably vegetabilic nature can be used depending upon availability, price and other ecological, commercial, and technological considerations.

If the polymer/filler material used for production of the central layer, and/or—optionally—for one of the outer layers of an asymmetric composite, is derived from recycled material, e.g. obtained from production scrap or by comminuting articles made of the inventive stratiform material by thermoforming or the like shaping or molding methods, such central layer will contain some mineral filler in addition to the particulate organic filler while one outer layer of an asymmetric composite will contain some organic filler.

The amount of mineral filler present in the central layer should, of course, be kept at a sufficiently low level to insure a sufficiently low specific weight of the composition of the central layer while the amount of organic filler in one outer layer of an asymmetric composite according to the invention should be sufficiently low to insure sufficient abrasion resistance.

The term "polypropylene" as used herein refers to all forms of polymerized propylene including it's various tacticities, e.g. isotactic, syntactic as well as syn-isotactic forms, and encompassing homopolymers as well as thermoplastic copolymers, graft-copolymers etc. that typically have a softening temperature of at least about 150° C. Polypropylene materials of various commercial provenience and having such molecular weights, melt viscosities and other processing parameters as are known to be suitable for extrusion purposes can be used in the present invention.

According to a general preferred embodiment, the present invention provides for a composite stratiform material having at least three interfused layers each containing polypropylene and at least one filler, characterized in that said material comprises: (I) a carrier layer formed of a mixture containing polypropylene and a particulate organic filler; (II) a first outer layer interfused with said carrier layer at a first interface and consisting essentially of a mixture containing polypropylene and an inorganic filler; and (III) a second outer layer interfused with said carrier layer at a second interface located opposite said first interface and consisting essentially of a mixture containing polypropylene and an inorganic filler.

Preferably, the central or carrier layer has a thickness of at least twice the thickness of each of the first and the second outer layer. A typical outer layer has a thickness in the range of from about 0.2 to about 0.4 mm and a typical stratiform material according to the invention will consist of two outer layers of about 0.2 mm and one carrier layer of about 1.2 mm. While thickness is not an essential parameter according to the invention, it is a major commercial advantage that a stratiform material according to the invention with a typical thickness of about 1.5 mm provides for excellent mechanical strength, toughness, and high abrasion resistance. While a three-layered structure is generally preferred according to the invention, additional (if relatively thin) layers may be applied, and for some purposes even a two-layered composite according to the invention might be of use, i.e. where the carrier layer that contains particulate organic filler forms an outer layer of the composite even though this is less preferred. In a similar manner, one of the outer layers might be formed of a polymer composition that contains a polymer other than polypropylene but is fusible with the polypropylene of the central layer and contains no filler, or contains a different type of filler but, again, this is less preferred.

Preferably, the polymer/filler-composition forming the carrier layer has a specific weight of not more than about 1.1 and contains from about 60 to about 5%, by weight, of polypropylene and from about 40 to about 95%, by weight, of a particulate and essentially non-fibrous organic filler as explained above, based upon the weight of said mixture forming said central layer. The mixture may contain some mineral filler as well if the feed stock includes recycled material; however, when using recycled material it must be assured that the polymer constituents are capable of interfusion upon heating. Further, all compositions for the layers may contain the usual additives, notably stabilizers, in conventional amounts. It is to be noted that specific weights as mentioned herein refer to the composition in the final product, i.e. in an essentially compacted or thermally fused state.

The polymer/filler composition forming the outer layers may have a specific weight of generally in the range from about 1.1 to about 1.5, and may contain from about 60 to about 40%, by weight, of polypropylene and from about 40 to about 60%, by weight, of said inorganic filler; generally, recycled material is used, if at all, only for one of the outer layers. Typical mineral fillers are powdered mineral substances of natural or synthetic origin including such materials as dolomite ($CaCO_3$), alumina, silica, silicates, ground glass, ashes, mineral fines, etc. as well as mixtures of such mineral fillers. Dyes and/or pigments including carbon black, titanium dioxide, etc. as well as other conventional additives may be incorporated in conventional amounts.

Generally, a composite stratiform material according to the invention has a thickness in the range of from 1 to 10 mm, preferably 1.2–3, and notably 1.4 to 2.0 mm, and a breakage angle at normal ambient temperature of at least about 135 angular degrees (°) and typically of about 180°. The breakage angle can be determined by cutting a sample of 200 mm×50 mm and bending it back manually upon itself. Breakage angles of less than 90° are less preferred because they indicate brittleness. The outer layers may have about the same or different thicknesses. If the thicknesses of the outer layers are not approximately equal, the surface of the product made of the material according to the invention which is exposed to abrasion, e.g. the outer side of a fruit or vegetable crate, should be formed by the thicker outer layer since the mineral filler is believed to be responsible, at least in part, for improved abrasion resistance. It has been found that the breakage angle as defined above provides a simple yet effective method to optimize thickness parameters as well as filler content of a composite multilayer material according to the invention.

As briefly mentioned above, the invention—according to a further embodiment thereof—provides for a stackable container of the general type used as a box or crate for shipping fruits or vegetables; conventionally, such containers are made of wood and cannot be recycled, or recycled only with regard to their caloric content. Containers according to the invention may have any required shape that can be produced easily by pressing a thermally plasticized (preferably at a temperature in the range of from about 180° C.–280° C.) stratiform material into a mould (preferably under a pressure in the range of from about 20–200bar) so as to yield an integral or monolithic box-shaped container, i.e. having a bottom and side walls, optionally reinforced by ribs or the like, and a generally open upper side. The edges and/or corner areas may have an increased thickness to provide for sufficient stability for stacking at least 5 and preferably at least about 10 loaded containers on top of each other without breakage.

The present invention differs from the content of the above mentioned European application EP94500081.8 in a number of aspects: first, with regard to objects, the present invention aims at a composite stratiform material that is particularly suited for production of containers with improved surface abrasion stability, such as are used for packaging and transporting fruits and vegetable products. A further object is to provide for a composite stratiform material having improved surface abrasion resistance while also having a relatively low specific weight and, last but not least, being capable of true recycling, i.e. repeated use of the material for producing identical or comparable articles of use without separation of polymer and filler constituents.

As regards essential features, it will be apparent from the above description that the present invention differs from EP94500081.8 in that the organic filler in the present invention is not fibrous but particulate, i.e. does not have a prominent length dimension; in a particulate organic filler material suitable for use according to the invention, such as particulate wood in the form of saw dust or wood flour, the largest particle dimension in any direction of space is not more than about 5 times greater than the smallest dimension in any direction of space.

Further, in the present invention, the polymer-filler mixture used for the layer between the outer layers (termed carrier layer herein) is not treated in a counter-rotating extrusion press; rather, the materials for all layers of the composite stratiform material according to the invention can be, and preferably are, produced by the same type of co-rotating double-screw or twin-screw extruder and fed into a common nozzle having at least three different inlet openings and only one outlet opening for co-extrusion as a stratiform composite material. The term "stratiform" as used herein is intended to designate a structure having a relatively small thickness dimension of typically in the range of from about 1 mm to about 10 mm and a typical width dimension of at least about 50 times the thickness dimension while a typical "length" dimension could be virtually infinite in line with a continuous production process. Cutting the stratiform material to a specified length, such as typically in the range of from about 1000 to about 5000 mm, is a mere matter of convenience and can be omitted if the web emanating from the extruder (and a subsequent roller or calander means) is introduced directly into a shaping operation, e.g. by reheating the web and by producing shaped articles of any desired type by stamping or press-molding the web in a suitable press. The term "web" as used herein relates to the stratiform structure resulting from extrusion and calendaring and retaining some heat so as to conserve sufficient plasticity for easy processing without breakage.

The invention will be illustrated but not limited by means of the enclosed drawings in which.

Figure 1:
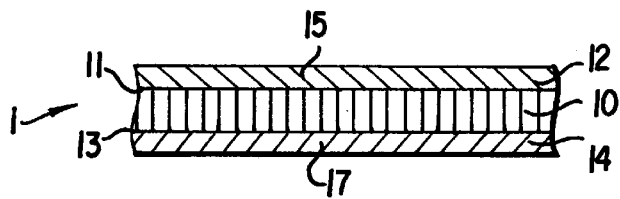
FIG. 1 is a diagrammatic sectional view of a broken-away portion of a composite stratiform material according to the invention.

The diagrammatic sectional side view of a stratiform material 1 according to the invention shown in FIG. 1 is intended to illustrate a carrier layer 10 interfused at opposite interfaces 11, 13 with a first outer layer 12 and a second outer layer 14. It will be understood that there need not be a sharply defined interface at the transition between carrier layer 10 and the adjacent outer layers 12, 14 because some intermixing may occur during co-extrusion of the three layers according to the invention.

The outer surfaces 15 and 17 of the composite material 1 are the exposed surfaces of any product produced from such materials and provide improved resistance against abrasion due to their content of mineral filler. It is to be noted that most polypropylenes have a relatively high abrasion resistance as such; the use of pure polypropylene, however, is less economical than the use of a mixture containing a filler that is available at low cost and with no substantial ecological problems. Since the material according to the invention is capable of being recycled for repeated use in typical articles made therefrom, such as fruit crates or boxes, the ecological advantages provided by the invention are substantial.

Figure 2:
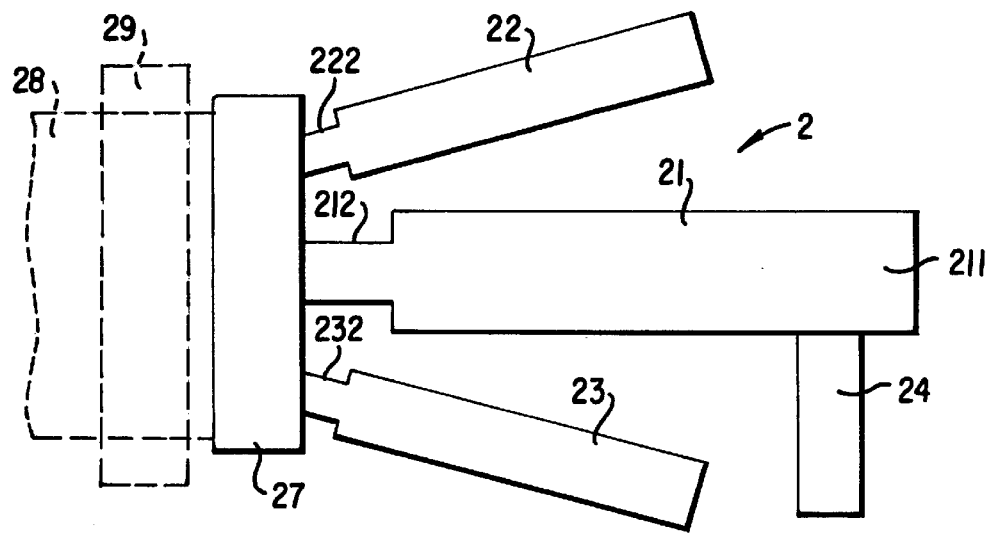
FIG. 2 is a flow diagram showing process streams when practicing the method according to the present invention.

FIG. 2 illustrates a diagrammatic top view of an apparatus 2 for producing the composite material according to the invention. Apparatus 2 includes a first co-rotational twin-screw extruder 21 of the type known per se in the art of extrusion. In it's feeding region 211, polypropylene is introduced by a conventional feeding installation (not illustrated in FIG. 2); further, particulate wood as explained above is fed via a lateral extruder 24, laterally connected with the extruder 21 near a feeding end region of extruder 21 which, in turn, preferably is a co-rotational twin-screw extruder operated to remove excessive humidity from the particulate wood filler prior to it's introduction into extruder 21.

At least one further extruder 22 and/or 23 is used to feed a mixture of polypropylene and mineral filler for outer layers 12, 14 into a co-extrusion nozzle or head 27 explained in more detail below. Extruders 22 and/or 23 are co-rotational twin-screw extruders. Obviously, the output capacities of extruders 22 and/or 23 will be selected, in a manner known to persons experienced in the art of extrusion, to the output capacity of extruder 21. For example, extruder 21 might have a screw diameter of 140 mm and a length of 32 times the diameter while extruder 22 and/or 23 might have a screw diameter of 70 mm, again with a length of 32 times the screw diameter; other operational parameters relating to the rate of output, such as speed of screw rotation, should be about the same while heating may be controlled differentially for optimal operation, depending upon the melt viscosity of the extruded composition.

Output ends 212, 222 and 232 feed into co-extrusion head 27 explained below. Head 27, on the other hand, produces an essentially endless web 28 of hot three-layered composite according to the invention. Generally, a calander 29 is used to smoothen the surfaces of web 28 and to consolidate the composite structure. Downstream of calander 29, web 28 will be shaped (or formed) (in a manner not shown) into the desired type of article or cut into panels.

Figure 3:
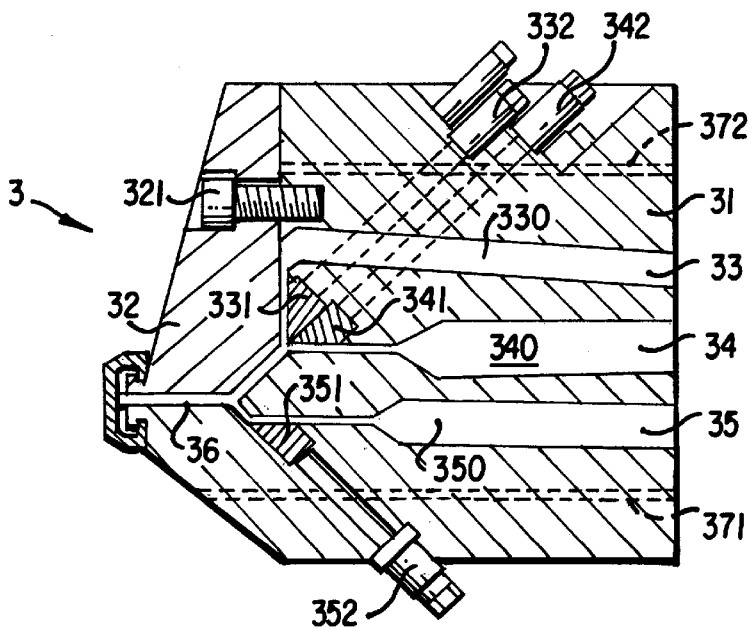
FIG. 3 is a diagrammatic sectional view of an extrusion head for producing a three-layered composite stratiform material according to the invention.

FIG. 3 is a semi-diagrammatic sectional illustration of a co-extrusion head 3 for use in the present invention. It is formed essentially of two matching die portions 31, 32 joined by a bolt 321. Die portion 31 is provided with three feeding ends 33, 34, 35 for connection with extruders as shown in FIG. 2, it being understood that one extruder might serve to feed both ends 33, 35 if the compositions of both outer layers are identical. Passages 330, 340 and 350 are provided in die portion 31 so as to feed a common conduit 36 for passing the three-layered composite formed by merging of the outlet conduits of passages 330, 340 and 350. Slide valves 331, 341, 351 are provided for control of the corresponding passages by adjusting the turning position of the nut-ends 332, 342 and 352 of cooperating control rods. Heating means 371, 372 are provided in die portion 31 for temperature control in a manner known per se. The outlet end of conduit 36 is be provided, again in a manner known per se, with a linear slot in accordance with the width of the web to be produced.

Various modifications of the illustrated example will be apparent to persons skilled in the art and are intended to be included within the scope of the invention.

For example, when the composition of both outer layers (12, 14 in FIG. 1) is the same, one common extruder (i.e. either 22 or 23 in FIG. 2) can be used for producing both outer layers; a forked connection between that extruder 22 or 23, and head 27, a manifold, or the like means of dividing a stream of a hot mixture of polypropylene and filler into two separate streams for producing the outer layers may be used to that end. Further, inclusion of small gas bubbles, or in other words, a finely "foamed" structure of the central layer may be used to further reduce the specific weight of composite materials according to the invention. By the same token, organic fillers having a finely porous structure may be used to reduce the specific weight of the central or carrier layer according to the invention.

What I claim is:

1. A method of producing a composite stratiform material by co-extrusion of at least three layers, each comprising polypropylene and at least one filler, said co-extrusion being effected by means of at least one extruder having a pair of co-rotating screws; said method comprising the step of co-extruding:

(I) a carrier layer formed of a mixture containing polypropylene and a particulate organic filler;

(II) a first outer layer consisting essentially of a mixture containing polypropylene and an inorganic filler; and (III) a second outer layer consisting essentially of a mixture containing polypropylene and an inorganic filler;

said co-extrusion providing for interfusion of said carrier layer with each of said first and said second outer layers at mutually opposite interfaces between said carrier layer and said outer layers; wherein said particulate organic filler for said carrier layer is selected from the group consisting of a vegetabilic nature and wood which is extruded by a co-rotational first extruder; and wherein said inorganic filler is introduced into at least one second extruder for extruding at least one of said outer layers;

wherein said carrier layer includes comminuted articles made by thermal molding of said composite stratiform material, or of production scrap, whereby the material is repeatedly recyclable.

2. The method of claim 1, wherein one of said outer layers comprises mixture of polypropylene and particulate inorganic mineral filler.

3. The method of claim 2 wherein said particulate organic filler is fed into said co-rotational first extruder for extruding said carrier layer, and said mineral filler is introduced into at least one second extruder for extruding at least one of said outer layers.

4. The method of claim 3, wherein said particulate organic filler is fed into said first co-rotational extruder by means of an additional co-rotational twin-screw extruder laterally connected with said first extruder near a feeding end region of said first extruder.

5. The method of claim 2, wherein said particulate organic filler is fed into said first co-rotational extruder by means of an additional co-rotational twin-screw extruder laterally connected with said first extruder near a feeding end region of said first extruder.

6. The method of claim 2, wherein said particulate organic filler is fed into said first co-rotational extruder by means of an additional co-rotational twin-screw extruder laterally connected with said first extruder near a feeding end region of said first extruder.

7. The method of claim 1, wherein said particulate organic filler is fed into said first co-rotational extruder by means of an additional co-rotational twin-screw extruder laterally connected with said first extruder near a feeding end region of said first extruder.

8. The method of claim 1, wherein said carrier layer has a thickness of at least twice the thickness of each of said first and said second outer layers.

9. The method of claim 1 comprising setting said co-extruder to extrude said stratiform material so as to have an overall thickness in a range of from 1 to 10 mm and a breakage angle at normal ambient temperature of at least about 135 angular degrees.

10. A method of producing a composite stratiform material by co-extrusion of at least three layers, each comprising polypropylene and at least one filler, said co-extrusion being effected by means of at least one extruder having a pair of co-rotating screws; said method comprising the step of co-extruding:

(I) a carrier layer formed of a mixture containing polypropylene and a particulate organic filler;

(II) a first outer layer consisting essentially of a mixture containing polypropylene and an inorganic filler; and (III) a second outer layer consisting essentially of a mixture containing polypropylene and an inorganic filler;

said co-extrusion providing for interfusion of said carrier layer with each of said first and said second outer layers at mutually opposite interfaces between said carrier layer and said outer layers; wherein said particulate organic filler for said carrier layer is selected from the group consisting of a vegetabilic nature and wood which is extruded by a co-rotational first extruder; and wherein said inorganic filler is introduced into at least one second extruder for extruding at least one of said outer layers;

wherein said carrier layer includes comminuted articles made by thermal molding of said composite stratiform material, or of production scrap, whereby the material is repeatedly recyclable; and wherein said mixture forming said carrier layer has a specific weight of not more than about 1.1 and contains from about 60% to about 5% by weight, of polypropylene and from about 40% to about 95% by weight, of said organic filler, based upon the weight of said mixture forming said carrier layer while said mixture forming said first and said second outer layers has a specific weight of from about 1.1 to about 1.5 and contains from about 60% to about 40% by weight of polypropylene and from about 40% to about 60% by weight of said inorganic filler.

11. A method of producing an article from a composite stratiform web, comprising forming the web by co-extruding at least three layers, each comprising polypropylene and at least one filler, the layers including (I) a carrier layer formed of a mixture containing polypropylene and a particulate organic filler, (II) a first outer layer consisting essentially of a mixture containing polypropylene and an inorganic filler, and (III) a second outer layer consisting essentially of a mixture containing polypropylene and an inorganic filler;

interfusing said carrier layer with each of said first and said second outer layers at mutually opposite interfaces between said carrier layer and said outer layers; wherein said particulate organic filler for said carrier layers is selected from the group consisting of a vegetabilic nature and wood;

wherein said carrier layer includes comminuted articles made by thermal molding of said composite stratiform web, or of production scrap, whereby the web is repeatedly recyclable; and shaping the web into the article.

* * * * *